United States Patent
Zhou et al.

(10) Patent No.: US 8,217,370 B2
(45) Date of Patent: *Jul. 10, 2012

(54) LUMINESCENT GLASS ELEMENT, PRODUCING METHOD THEREOF AND LUMINESCING METHOD THEREOF

(75) Inventors: Mingjie Zhou, Shenzhen (CN); Wenbo Ma, Shenzhen (CN); Yugang Liu, Shenzhen (CN)

(73) Assignee: Ocean's King Lighting Science & Technology Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/229,571

(22) Filed: Sep. 9, 2011

(65) Prior Publication Data

US 2011/0315896 A1    Dec. 29, 2011

Related U.S. Application Data

(63) Continuation of application No. PCT/CN2009/072462, filed on Jun. 26, 2009.

(51) Int. Cl.
  *G01N 21/64* (2006.01)
(52) U.S. Cl. .............. 250/459.1; 250/458.1; 501/65; 501/53; 501/78; 501/152
(58) Field of Classification Search .......... 250/458.1, 250/459.1; 501/64, 53, 55, 72, 73, 78, 152, 501/154

See application file for complete search history.

(56) References Cited

U.S. PATENT DOCUMENTS

| | | | |
|---|---|---|---|
| 3,523,091 A | 8/1970 | McAllister | |
| 2001/0048966 A1 | 12/2001 | Trumble et al. | |
| 2006/0063009 A1* | 3/2006 | Naitou et al. | 428/427 |

FOREIGN PATENT DOCUMENTS

| | | |
|---|---|---|
| CN | 1805105 | 7/2006 |
| CN | 101071751 | 11/2007 |
| CN | 101442089 | 5/2009 |

OTHER PUBLICATIONS

International Search Report of PCT/CN2009/072462 dated Jan. 7, 2010.

* cited by examiner

*Primary Examiner* — David Porta
*Assistant Examiner* — Yara Green
(74) *Attorney, Agent, or Firm* — Hamre, Schumann, Mueller & Larson, P.C.

(57) ABSTRACT

The present invention relates to a luminescent glass element comprising a luminescent glass substrate, which a metal layer is positioned on a surface thereof. The metal layer is provided with a metal microstructure. The luminescent glass substrate has composite oxides represented as the following formula: $aM_2O.bY_2O_3.cSiO_2.dTm_2O_3$, wherein M represents alkali metal element, a, b, c and d are, by mol part, 25-60, 1-30, 20-70 and 0.001-10 respectively. The present invention also provides a producing method of the luminescent glass element and a luminescing method thereof. The metal layer is positioned on the luminescent glass substrate, thereby improving luminescence efficiency of the luminescent glass substrate. The luminescent glass element can be used in luminescent devices with ultrahigh brightness or high-speed operation.

18 Claims, 4 Drawing Sheets

LUMINESCENT GLASS ELEMENT, PRODUCING METHOD THEREOF AND LUMINESCING METHOD THEREOF

TECHNICAL FIELD

The present invention relates to luminescent materials, and particularly to a luminescent glass element with a glass substrate as the luminescent material, a producing method thereof and a luminescing method thereof.

BACKGROUND

Traditional materials for luminescent substrates include fluorescent powder, nanocrystals, glasses, etc. In comparison to the fluorescent powder and nanocrystals, the glasses are transparent and hard, and have good chemical stability and good optical properties, and can be readily machined into a variety of products with different dimensions and shapes, for example, monitors or lighting sources with various dimensions and shapes.

For example, in vacuum microelectronics field, field emission displays typically utilize the luminescent glasses as luminescent units thereof, and are widely applied in light and display fields and attract extensive attentions from research organizations at home and abroad. The operating principle of the field emission displays is described as follows: a positive voltage is applied by an anode facing toward field emission cathode arrays (hereinafter referred to as FEAs) to form an accelerating field in vacuum condition, electrons emitted from cathodes are accelerated to impact luminescent materials on the anode and excited the luminescent materials to illuminate. The field emission displays have broad operating temperatures (−40° C.-80° C.), short response time (<1 ms), compact structure, low power consumption, and satisfy a demand for green environmental protection. The materials such as phosphor powder, luminescent glasses and luminescent films can be used as the luminescent materials in the field emission displays. However, these materials have a natural shortage of low luminescence efficiency, which significantly constrains application of the field emission displays, particularly in lighting field.

SUMMARY

Therefore, in accordance with an aspect of the present invention, a luminescent glass element is provided, which has good light transmittance, high uniformity, high luminescence efficiency, good stability and compact structure. A producing method of the luminescent glass element is also provided, which can reduce cost and simplify the process.

Further, in accordance with another aspect of the present invention, a luminescing method of the luminescent glass element is provided, which can be readily operated, and has a high reliability and an improved luminescence efficiency for the luminescent material.

A luminescent glass element comprises a luminescent glass substrate, which a metal layer is positioned on a surface of. The metal layer is provided with a metal microstructure. The luminescent glass substrate has composite oxides represented as the following formula:

Wherein M represents alkali metal element, a, b, c and d are, by mol part, 25-60, 1-30, 20-70 and 0.001-10 respectively.

A producing method of a luminescent glass element comprises the following steps:

Preparing a luminescent glass substrate, the luminescent glass substrate has composite oxides represented as the following formula: $aM_2O.bY_2O_3.cSiO_2.dTm_2O_3$, wherein M represents alkali metal element, a, b, c and d are, by mol part, 25-60, 1-30, 20-70 and 0.001-10 respectively;

Forming a metal layer positioned on a surface of the luminescent glass substrate; and Performing an annealing treatment in vacuum for the luminescent glass substrate and the metal layer to provide the metal layer with a metal microstructure, cooling, and then forming the luminescent glass element.

Further, a luminescing method of a luminescent glass element comprises the following steps:

Obtaining a luminescent glass element according to the producing method described above; and Emitting cathode rays to the metal layer, forming surface plasmons between the metal layer and the luminescent glass substrate under excitation of the cathode rays, and inducing luminescence from the luminescent glass substrate.

The present invention uses a metal layer positioned on the luminescent glass substrate, which has a metal microstructure and can induce formation of surface plasmons at the interface between the luminescent glass substrate and the metal layer under excitation of the cathode rays. By means of surface plasmon effect, internal quantum efficiency of the luminescent glass substrate is significantly increased, namely, spontaneous radiation of the luminescent glass substrate is enhanced. Accordingly, the luminescence efficiency of the luminescent glass substrate is significantly improved. By this way, the present invention provides a solution for the problem of low luminescence efficiency of the traditional luminescent materials. Therefore, according to the luminescing method of the luminescent glass element, when emitting cathode rays to the metal layer, surface plasmons can be formed between the metal layer and the luminescent glass substrate under the excitation of the cathode rays to enhance luminescence efficiency of the luminescent glass substrate and improve luminescent reliability thereof. Further, according to the producing method of the luminescent element, the desired luminescent glass element can be obtained by forming a metal layer on the luminescent glass substrate and then annealing it, accordingly simplifying the producing method, reducing cost, and possessing wide and promising practical applications.

DRAWINGS

The present invention will be explained below in detail with reference to the following embodiments and the accompanying drawings, in which.

DETAILED DESCRIPTION

Objects, advantages and technical solutions of the present invention will be explained below in detail with reference to the following embodiments and the accompanying drawings. But it will be understood that the following description of the embodiment(s) is merely to explain the present invention and is no way intended to limit the present invention.

Figure 1:
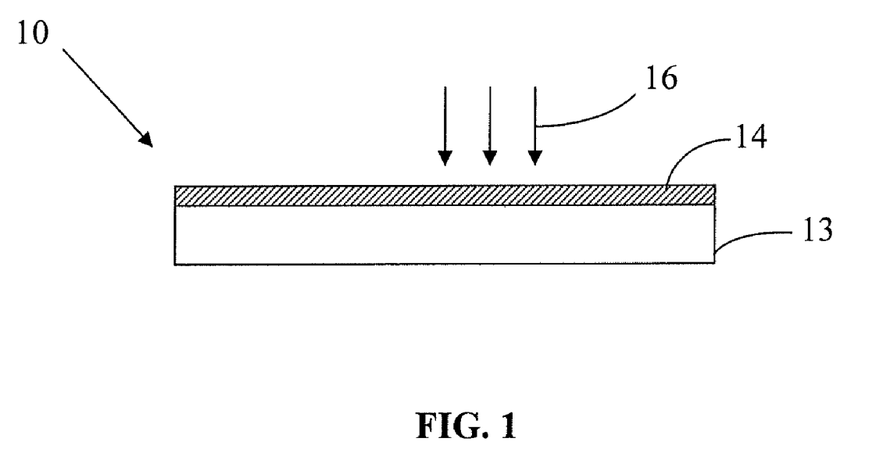
FIG. 1 is a schematic view of a structure of a luminescent glass element in accordance with an embodiment of the present invention.

A luminescent glass element 10 in accordance with an embodiment of the present invention is shown in FIG. 1, which includes a luminescent glass substrate 13 and a metal layer 14 positioned on a surface of the luminescent glass substrate 13. The metal layer 14 is provided with a metal microstructure. The metal microstructure is sometimes referred to as micro-nano structure. Further, the metal microstructure is aperiodic, namely, composed of metal crystals in a random array.

The luminescent glass substrate 13 has composite oxides represented as the following formula: $aM_2O \cdot bY_2O_3 \cdot cSiO_2 \cdot dTm_2O_3$, wherein M represents alkali metal element, a, b, c and d are, by mol part, 25-60, 1-30, 20-70 and 0.001-10 respectively. The luminescent glass substrate 13 contains thulium oxide, which make the luminescent glass emit light and have good performance in the substrate with such compositions. The luminescent glass substrate 13 also has good light transmittance.

Wherein, the metal layer 14 can be made of metals with good chemical stability, for example, some metals which are difficult to be oxidized or corroded, or common metals. The metal is preferably at least one of gold, silver, aluminum, copper, titanium, iron, nickel, cobalt, chromium, platinum, palladium, magnesium, zinc, more preferably at least one of gold, silver, aluminum. The metal type in the metal layer may be a single metal thereof or a composite metal thereof. The composite metal may be an alloy of two or more above metals. For example, the metal layer 14 may be an alloy layer composed of silver and aluminum, or an alloy layer composed of gold and aluminum, wherein weight percents of silver or gold are preferably more than 70%. The metal layer 14 has a preferred thickness of 0.5 nm to 200 nm, more preferably 1 nm to 100 nm.

The alkali metal element M is preferably at least one of Na, K, Li.

The luminescent glass element 10 is used as a luminescent element and can be widely applied in luminescent devices with ultrahigh brightness or high-speed operation, for example, field emission displays, field emission light sources, large-size billboards or the like products. Taking a field emission display as an example, a positive voltage is applied by an anode facing toward field emission cathode arrays to form an accelerating field, electrons are emitted from a cathode, namely, cathode rays 16 are emitted onto the metal layer 14, and then surface plasmons are formed between the metal layer with the microstructure and the luminescent glass substrate. By means of surface plasmon effect, the internal quantum efficiency of the luminescent glass substrate 13 is significantly increased, namely, spontaneous radiation of the luminescent glass substrate is enhanced. Accordingly, luminescence efficiency of the luminescent glass substrate is significantly improved. By this way, the present invention provides a solution for the problem of low luminescence efficiency of the traditional luminescent materials. Furthermore, since the metal layer is formed on a surface of the luminescent glass substrate 13, a homogeneous interface is formed between the entire metal layer and the luminescent glass substrate 13, thereby improving uniformity of luminescence.

Figure 2:
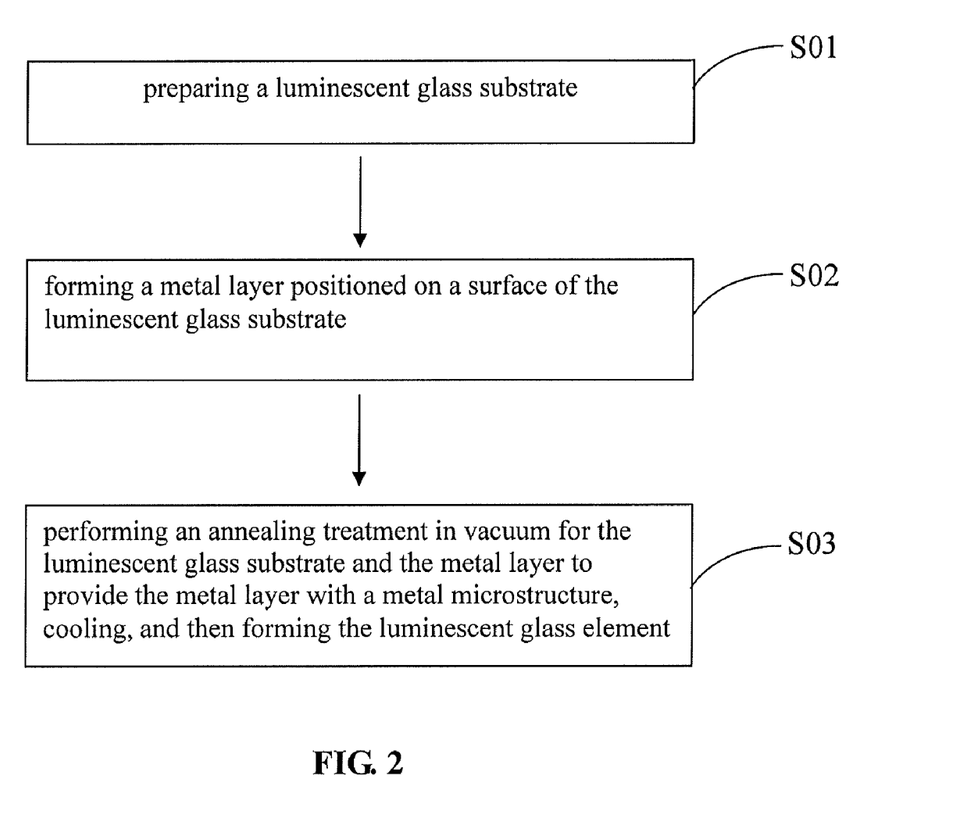
FIG. 2 is a flow chart of a producing method of the luminescent glass element in accordance with the embodiment of the present invention.

Referring to FIGS. 1 and 2, illustrating a flow chart of a producing method of the luminescent glass element in accordance with the embodiment of the present invention, which includes the following steps:

S01: preparing a luminescent glass substrate, wherein the luminescent glass substrate 13 has the compositions and mol parts described above, namely, includes composite oxides represented as the following formula: $aM_2O \cdot bY_2O_3 \cdot cSiO_2 \cdot dTm_2O_3$, wherein M represents alkali metal element, a, b, c and d are, by mol part, 25-60, 1-30, 20-70 and 0.001-10 respectively;

S02: forming a metal layer positioned on a surface of the luminescent glass substrate; and S03: performing an annealing treatment in vacuum for the luminescent glass substrate and the metal layer to provide the metal layer with a metal microstructure, cooling, and then forming the luminescent glass element.

Wherein, preparation of the luminescent glass substrate 13 is described in detail as follows: taking analytically pure alkali metal salt, silicon dioxide and 99.99% $Y_2O_3$, $Tm_2O_3$ as main raw materials, weighting the raw materials according to mol part ratios of respective compositions in the chemical formula of $aM_2O \cdot bY_2O_3 \cdot cSiO_2 \cdot dTm_2O_3$ of the luminescent glass substrate, mixing and melting the raw materials at 1200 centigrade degrees to 1500 centigrade degrees for one to five hours, cooling to room temperature, annealing at 600 centigrade degrees to 1100 centigrade degrees for one to twenty hours in a reductive atmosphere, and then obtaining the luminescent glass substrate. Further, the glass substrate may be cut and polished to have a certain size, thereby obtaining the desired luminescent glass substrate.

As structures described above, the metal layer 14 may be made of metals with good chemical stability, for example, some metals which are difficult to be oxidized or corroded, or common metals. The metal is preferably at least one of gold, silver, aluminum, copper, titanium, iron, nickel, cobalt, chromium, platinum, palladium, magnesium, zinc, more preferably at least one of gold, silver, aluminum. The metal type in the metal layer may be a single metal thereof or a composite metal thereof. The metal layer 14 has a preferred thickness of 0.5 nm to 200 nm, more preferably 1 nm to 100 nm. The alkali metal element M is preferably at least one of Na, K, Li.

In step S02, the metal layer is formed by sputtering or evaporation depositing metal on the surface of the luminescent glass substrate. Step S03 is described in detail as follows: after forming the metal layer on the surface of the luminescent glass substrate, annealing the metal layer at 50 centigrade degrees to 650 centigrade degrees for five minutes to five hours, and then naturally cooling to room temperature. Wherein, the annealing temperature is preferably 100 centigrade degrees to 500 centigrade degrees, and annealing period is preferably fifteen minutes to three hours.

Figure 3:
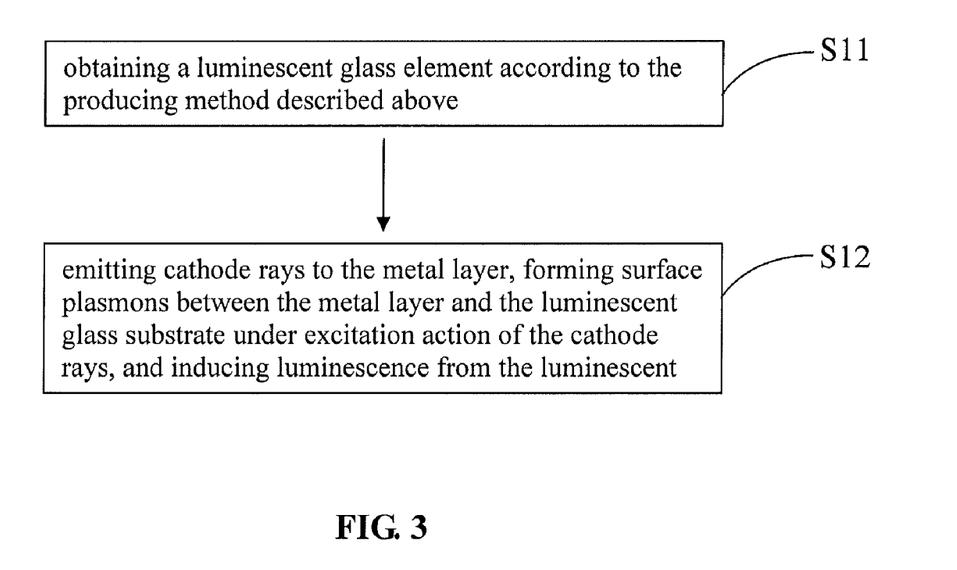
FIG. 3 is a flow chart of a luminescing method of the luminescent glass element in accordance with the embodiment of the present invention.

Referring to FIGS. 1 and 3, illustrating a flow chart of a luminescing method of the luminescent glass element in accordance with the embodiment of the present invention, which includes the following steps:

S11: obtaining a luminescent glass element 10 according to the producing method described above; and S12: emitting cathode rays 16 to the metal layer 14, forming surface plasmons between the metal layer and the luminescent glass substrate 13 under excitation of the cathode rays 16, and inducing luminescence from the luminescent glass substrate 13.

The luminescent glass element 10 has features such as structure and compositions as described above. In practical application, for example a field emission display or a lighting source, under a vacuum condition, a positive voltage is applied by an anode facing toward field emission cathode arrays to form an accelerating field, the cathode rays 16 are emitted from a cathode, under excitation of the cathode rays 16, electron beams firstly penetrate through the metal layer 14 and then excite the luminescent glass substrate 13 to emit light. During this process, surface plasmon effect is generated at the interface between the metal layer 14 and the luminescent glass substrate 13. By means of the effect, the internal quantum efficiency of the luminescent glass substrate is significantly increased, namely, spontaneous radiation of the luminescent glass substrate is increased, accordingly significantly improving luminescence efficiency of the luminescent glass substrate.

Surface plasmon (hereinafter referred to as SP) is a kind of wave propagating along an interface between metal and dielectric, its amplitude exponentially attenuates along a distance facing away from the interface. When varying surface structure of the metal, properties, dispersion relation, excitation mode and coupling effect of surface plasmon polaritons (hereinafter referred to as SPPs) significantly vary. SPPs can induce electromagnetic field which can constrain propagation of light wave in a structure with a subwavelength dimension and can generate and control electromagnetic radiation from optical frequency to microwavelength band, accordingly achieving active manipulation to optical propagation. Therefore, the present embodiment utilizes excitation property of SPPs to increase the intensity of luminescent glass substrate in an optics state and improve spontaneous radiation velocity of the luminescent glass substrate. Further, by means of the coupling effect of surface plasmons, when the luminescent glass substrate emits lights, coupling resonance effect is generated accordingly, thereby significantly increasing internal quantum efficiency of the luminescent glass substrate and improving luminescent efficiency of the luminescent glass substrate.

Various compositions of the luminescent glass element and the producing method thereof, as well as properties thereof are described below by a number of exemplary examples.

Example 1

A luminescent glass, $30Na_2O.9.8Y_2O_3.60SiO_2.0.2Tm_2O_3$ (the numbers before the oxides represent mol parts of the respective oxides, the same is below), is selected, which is formed as a substrate according to the above-described producing method and has a size of $1\times1$ cm$^2$, and a surface of which is polished. Then, a silver metal layer with a thickness of 2 nm is deposited on the surface of the glass by a magnetron sputtering device. The glass with the silver metal layer is placed into a vacuum environment with a vacuum degree of lower than $1\times10^{-3}$ Pa to perform an annealing treatment at 300 centigrade degrees for half an hour, and then is cooled to room temperature, accordingly obtaining the luminescent glass element of this Example.

Figure 4:
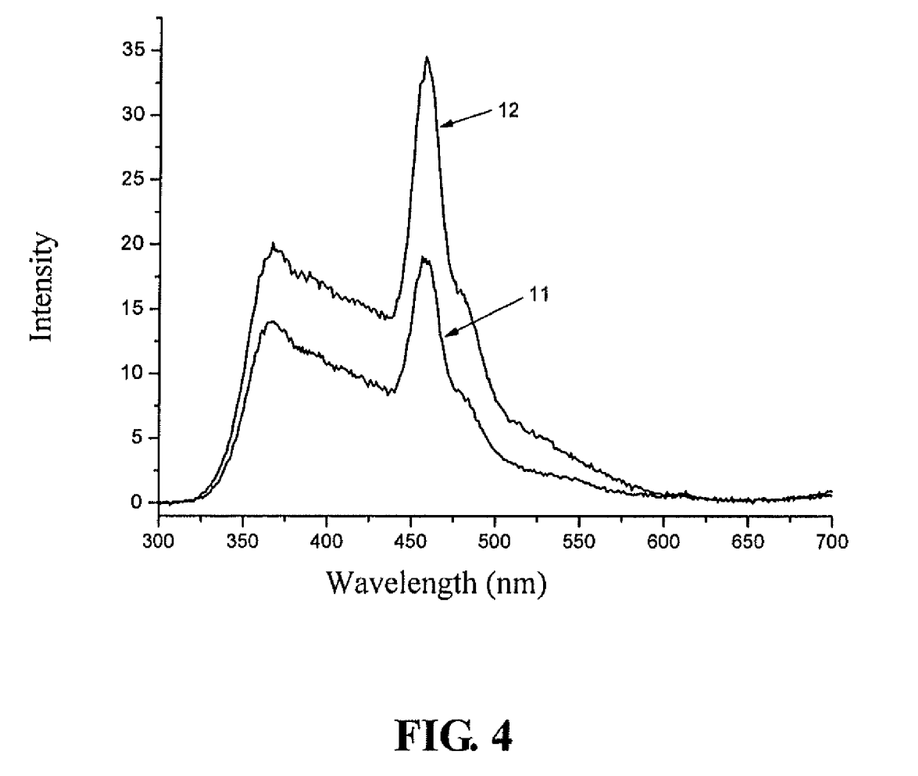
FIG. 4 shows luminescence spectrums of a luminescent glass element of Example 1 and a luminescent glass without a metal layer as a comparison, wherein the luminescence spectrum excited by cathode rays is measured at an exciting acceleration voltage of electron beam of 7 KV.

Cathode rays generated by an electron gun bombard the luminescent glass element of Example 1 and then a luminescence spectrum, as shown in FIG. 4, is generated. A curve 11 in the figure represents a luminescence spectrum from a glass without a silver layer, and a curve 12 in the figure represents a luminescence spectrum from the luminescent glass element of this Example. As seen from the FIG. 4, since a surface plasmon effect is generated between the metal layer and the glass, in comparison to a luminescent glass without any metal layer, the luminescent glass element of this Example 1 has a 1.65 times luminescent intensity of that of the luminescent glass without any metal layer, namely improving luminescent characteristics. Luminescence spectrums of the following Examples are essentially similar to that of Example 1, and luminescent glass elements thereof have essentially similar luminescent intensity effect to Example 1, so we will not go into the detail of the following Examples.

Example 2

A luminescent glass, $25Na_2O.15Y_2O_3.45SiO_2.5Tm_2O_3$, is selected, which is formed as a substrate according to the above-described producing method and has a size of $1\times1$ cm$^2$, and a surface of which is polished. Then, a gold metal layer with a thickness of 0.5 nm is deposited on the surface of the glass by a magnetron sputtering device. The glass with the gold metal layer is placed into a vacuum environment with a vacuum degree of lower than $1\times10^{-3}$ Pa to perform an annealing treatment at 200 centigrade degrees for an hour, and then is cooled to room temperature, accordingly obtaining the luminescent glass element of this Example.

Example 3

A luminescent glass, $27Na_2O.1Y_2O_3.70SiO_2.0.001Tm_2O_3$, is selected, which is formed as a substrate according to the above-described producing method and has a size of $1\times1$ cm$^2$, and a surface of which is polished. Then, an aluminum metal layer with a thickness of 200 nm is deposited on the surface of the glass by a magnetron sputtering device. The glass with the aluminum metal layer is placed into a vacuum environment with a vacuum degree of lower than $1\times10^{-3}$ Pa to perform an annealing treatment at 500 centigrade degrees for five hours, and then is cooled to room temperature, accordingly obtaining the luminescent glass element of this Example.

Example 4

A luminescent glass, $32Na_2O.5Y_2O_3.65SiO_2.0.1Tm_2O_3$, is selected, which is formed as a substrate according to the above-described producing method and has a size of $1\times1$ cm$^2$, and a surface of which is polished. Then, a magnesium metal layer with a thickness of 100 nm is deposited on the surface of the glass by a beam evaporation device. The glass with the magnesium metal layer is placed into a vacuum environment with a vacuum degree of lower than $1\times10^{-3}$ Pa to perform an annealing treatment at 650 centigrade degrees for five minutes, and then is cooled to room temperature, accordingly obtaining the luminescent glass element of this Example.

Example 5

A luminescent glass, $35Na_2O.10Y_2O_3.50SiO_2.2Tm_2O_3$, is selected, which is formed as a substrate according to the above-described producing method and has a size of $1\times1$ cm$^2$, and a surface of which is polished. Then, a palladium metal layer with a thickness of 1 nm is deposited on the surface of the glass by a beam evaporation device. The glass with the palladium metal layer is placed into a vacuum environment with a vacuum degree of lower than $1\times10^{-3}$ Pa to perform an annealing treatment at 100 centigrade degrees for three hours, and then is cooled to room temperature, accordingly obtaining the luminescent glass element of this Example.

Example 6

A luminescent glass, $38Na_2O.12Y_2O_3.43SiO_2.0.5Tm_2O_3$, is selected, which is formed as a substrate according to the above-described producing method and has a size of 1×1 cm², and a surface of which is polished. Then, a platinum metal layer with a thickness of 5 nm is deposited on the surface of the glass by a beam evaporation device. The glass with the platinum metal layer is placed into a vacuum environment with a vacuum degree of lower than $1 \times 10^{-3}$ Pa to perform an annealing treatment at 450 centigrade degrees for fifteen minutes, and then is cooled to room temperature, accordingly obtaining the luminescent glass element of this Example.

Example 7

A luminescent glass, $28Na_2O.10Y_2O_3.68SiO_2.2Tm_2O_3$, is selected, which is formed as a substrate according to the above-described producing method and has a size of 1×1 cm², and a surface of which is polished. Then, an iron metal layer with a thickness of 20 nm is deposited on the surface of the glass by a beam evaporation device. The glass with the iron metal layer is placed into a vacuum environment with a vacuum degree of lower than $1 \times 10^{-3}$ Pa to perform an annealing treatment at 50 centigrade degrees for five hours, and then is cooled to room temperature, accordingly obtaining the luminescent glass element of this Example.

Example 8

A luminescent glass, $35Li_2O.18Y_2O_3.55SiO_2.6Tm_2O_3$, is selected, which is formed as a substrate according to the above-described producing method and has a size of 1×1 cm², and a surface of which is polished. Then, a titanium metal layer with a thickness of 10 nm is deposited on the surface of the glass by a beam evaporation device. The glass with the titanium metal layer is placed into a vacuum environment with a vacuum degree of lower than $1 \times 10^{-3}$ Pa to perform an annealing treatment at 150 centigrade degrees for two hours, and then is cooled to room temperature, accordingly obtaining the luminescent glass element of this Example.

Example 9

A luminescent glass, $40Li_2O.22Y_2O_3.40SiO_2.8Tm_2O_3$, is selected, which is formed as a substrate according to the above-described producing method and has a size of 1×1 cm², and a surface of which is polished. Then, a copper metal layer with a thickness of 50 nm is deposited on the surface of the glass by a beam evaporation device. The glass with the copper metal layer is placed into a vacuum environment with a vacuum degree of lower than $1 \times 10^{-3}$ Pa to perform an annealing treatment at 200 centigrade degrees for 2.5 hours, and then is cooled to room temperature, accordingly obtaining the luminescent glass element of this Example.

Example 10

A luminescent glass, $50Li_2O.25Y_2O_3.30SiO_2.9.5Tm_2O_3$, is selected, which is formed as a substrate according to the above-described producing method and has a size of 1×1 cm², and a surface of which is polished. Then, a zinc metal layer with a thickness of 150 nm is deposited on the surface of the glass by a beam evaporation device. The glass with the zinc metal layer is placed into a vacuum environment with a vacuum degree of lower than $1 \times 10^{-3}$ Pa to perform an annealing treatment at 350 centigrade degrees for half an hour, and then is cooled to room temperature, accordingly obtaining the luminescent glass element of this Example.

Example 11

A luminescent glass, $60Li_2O.30Y_2O_3.40SiO_2.10Tm_2O_3$, is selected, which is formed as a substrate according to the above-described producing method and has a size of 1×1 cm², and a surface of which is polished. Then, a chromium metal layer with a thickness of 120 nm is deposited on the surface of the glass by a beam evaporation device. The glass with the chromium metal layer is placed into a vacuum environment with a vacuum degree of lower than $1 \times 10^{-3}$ Pa to perform an annealing treatment at 250 centigrade degrees for two hours, and then is cooled to room temperature, accordingly obtaining the luminescent glass element of this Example.

Example 12

A luminescent glass, $33K_2O.7Y_2O_3.58SiO_2.0.7Tm_2O_3$, is selected, which is formed as a substrate according to the above-described producing method and has a size of 1×1 cm², and a surface of which is polished. Then, a nickel metal layer with a thickness of 40 nm is deposited on the surface of the glass by a beam evaporation device. The glass with the nickel metal layer is placed into a vacuum environment with a vacuum degree of lower than $1 \times 10^{-3}$ Pa to perform an annealing treatment at 80 centigrade degrees for four hours, and then is cooled to room temperature, accordingly obtaining the luminescent glass element of this Example.

Example 13

A luminescent glass, $26K_2O.4Y_2O_3.69SiO_2.0.9Tm_2O_3$, is selected, which is formed as a substrate according to the above-described producing method and has a size of 1×1 cm², and a surface of which is polished. Then, a cobalt metal layer with a thickness of 180 nm is deposited on the surface of the glass by a beam evaporation device. The glass with the cobalt metal layer is placed into a vacuum environment with a vacuum degree of lower than $1 \times 10^{-3}$ Pa to perform an annealing treatment at 400 centigrade degrees for an hour, and then is cooled to room temperature, accordingly obtaining the luminescent glass element of this Example.

Example 14

A luminescent glass, $45K_2O.8Y_2O_3.48SiO_2.1.5Tm_2O_3$, is selected, which is formed as a substrate according to the above-described producing method and has a size of 1×1 cm², and a surface of which is polished. Then, a silver and aluminum metal layer with a thickness of 80 nm is deposited on the surface of the glass by a beam evaporation device. Wherein, contents of silver and aluminum in the metal layer are 80% by weight and 20% by weight respectively. The glass with the silver layer is placed into a vacuum environment with a vacuum degree of lower than $1 \times 10^{-3}$ Pa to perform an annealing treatment at 380 centigrade degrees for 2.5 hours, and then is cooled to room temperature, accordingly obtaining the luminescent glass element of this Example.

Example 15

A luminescent glass, $36K_2O.16Y_2O_3.52SiO_2.4Tm_2O_3$, is selected, which is formed as a substrate according to the above-described producing method and has a size of 1×1 cm², and a surface of which is polished. Then, a silver and aluminum metal layer with a thickness of 15 nm is deposited on the surface of the glass by a beam evaporation device. Wherein, contents of silver and aluminum in the metal layer are 90% by weight and 10% by weight respectively. The glass with the silver and aluminum metal layer is placed into a vacuum environment with a vacuum degree of lower than $1 \times 10^{-3}$ Pa to perform an annealing treatment at 180 centigrade degrees for 3.5 hours, and then is cooled to room temperature, accordingly obtaining the luminescent glass element of this Example.

Example 16

A luminescent glass, $55K_2O.3Y_2O_3.62SiO_2.7Tm_2O_3$, is selected, which is formed as a substrate according to the above-described producing method and has a size of 1×1 cm², and a surface of which is polished. Then, a gold and aluminum metal layer with a thickness of 35 nm is deposited on the surface of the glass by a beam evaporation device. Wherein, contents of gold and aluminum in the metal layer are 80% by weight and 20% by weight respectively. The glass with the gold and aluminum metal layer is placed into a vacuum environment with a vacuum degree of lower than $1\times10^{-3}$ Pa to perform an annealing treatment at 70 centigrade degrees for 1.5 hours, and then is cooled to room temperature, accordingly obtaining the luminescent glass element of this Example.

Example 17

A luminescent glass, $58K_2O.6Y_2O_3.35SiO_2.9Tm_2O_3$, is selected, which is formed as a substrate according to the above-described producing method and has a size of 1×1 cm², and a surface of which is polished. Then, a gold and aluminum metal layer with a thickness of 60 nm is deposited on the surface of the glass by a beam evaporation device. Wherein, contents of gold and aluminum in the metal layer are 90% by weight and 10% by weight respectively. The glass with the gold and aluminum metal layer is placed into a vacuum environment with a vacuum degree of lower than $1\times10^{-3}$ Pa to perform an annealing treatment at 600 centigrade degrees for 4.5 hours, and then is cooled to room temperature, accordingly obtaining the luminescent glass element of this Example.

In the above-described embodiments, the metal layer 14 with a microstructure is positioned on the luminescent glass substrate 13, and the metal layer 14 can induce a formation of the surface plasmons at the interface of the metal layer 14 and the luminescent glass substrate 13 under excitation of the cathode rays 16. By means of the surface plasmon effect, the internal quantum efficiency of the luminescent glass substrate is significantly increased, namely, spontaneous radiation of the luminescent glass substrate is increased, accordingly significantly increasing luminescence efficiency of the luminescent glass substrate. Therefore, in the luminescing method of the luminescent glass element, by emitting cathode rays 16 to the metal layer 14, surface plasmons are formed between the metal layer 14 and the luminescent glass substrate 13 to increase luminescence efficiency of the luminescent glass substrate 13 and improve luminescent reliability thereof.

In the producing method of the luminescent glass element of the embodiment of the present invention, the luminescent glass element 10 can be obtained by forming a metal layer 14 on the luminescent glass substrate 13 and then annealing it, accordingly simplifying the producing method, reducing cost, and possessing wide and promising practical applications. Particularly, it can be widely applied in luminescent devices with a ultrahigh brightness or a high-speed operation, for example, field emission displays.

The above-mentioned is only the preferred embodiments of the present invention, but places no limit to the invention. Therefore, any modification, equivalent replacement and improvement etc on the basis of the spirit and principle of invention shall be within the protective scope of the present invention.

The invention claimed is:

1. A luminescent glass element, comprising:
   a luminescent glass substrate; and
   a metal layer positioned on a surface of the luminescent glass substrate; the metal layer being provided with a metal microstructure, the luminescent glass substrate having composite oxides represented as the following formula:

$aM_2O.bY_2O_3.cSiO_2.dTm_2O_3$, wherein M represents alkali metal element, a, b, c and d are, by mol part, 25-60, 1-30, 20-70 and 0.001-10 respectively.

2. The luminescent glass element of claim 1, wherein the alkali metal element is at least one of Na, K, Li.

3. The luminescent glass element of claim 1, wherein metal of the metal layer is at least one of gold, silver, aluminum, copper, titanium, iron, nickel, cobalt, chromium, platinum, palladium, magnesium, zinc.

4. The luminescent glass element of claim 3, wherein the metal of the metal layer is at least one of gold, silver, aluminum.

5. The luminescent glass element of claim 1, wherein the metal layer has a thickness of 0.5 nm to 200 nm.

6. A producing method of a luminescent glass element, comprising the following steps:
   preparing a luminescent glass substrate, the luminescent glass substrate having composite oxides represented as the following formula: $aM_2O.bY_2O_3.cSiO_2.dTm_2O_3$, wherein M represents alkali metal element, a, b, c and d are, by mol part, 25-60, 1-30, 20-70 and 0.001-10 respectively;
   forming a metal layer on a surface of the luminescent glass substrate; and
   performing an annealing treatment in vacuum for the luminescent glass substrate and the metal layer to provide the metal layer with a metal microstructure, cooling, and then forming the luminescent glass element.

7. The producing method of claim 6, wherein the preparation of the luminescent glass substrate comprises the following steps: taking alkali metal salt, silicon dioxide, $Y_2O_3$ and $Tm_2O_3$ as raw materials according to respective mol parts thereof, mixing and melting the raw materials at 1200 centigrade degrees to 1500 centigrade degrees, cooling, annealing at 600 centigrade degrees to 1100 centigrade degrees in a reductive atmosphere, and then obtaining the luminescent glass substrate.

8. The producing method of a luminescent glass element of claim 6, wherein the metal layer is formed by sputtering or evaporation depositing metal on the surface of the luminescent glass substrate.

9. The producing method of a luminescent glass element of claim 6, wherein the annealing treatment in vacuum is performed at 50 centigrade degrees to 650 centigrade degrees for five minutes to five hours.

10. The producing method of a luminescent glass element of claim 6, wherein metal of the metal layer is at least one of gold, silver, aluminum, copper, titanium, iron, nickel, cobalt, chromium, platinum, palladium, magnesium, zinc.

11. The producing method of a luminescent glass element of claim 6, wherein metal of the metal layer is at least one of gold, silver, aluminum.

12. The producing method of a luminescent glass element of claim 6, wherein the metal layer has a thickness of 0.5 nm to 200 nm.

13. A luminescing method of a luminescent glass element, comprises the following steps:
   obtaining a luminescent glass element according to the producing method according to claim 6; and
   emitting cathode rays to the metal layer, forming surface plasmons between the metal layer and the luminescent glass substrate under excitation of the cathode rays, and inducing luminescence from the luminescent glass substrate.

14. The luminescing method of claim 13, wherein metal of the metal layer is at least one of gold, silver, aluminum, copper, titanium, iron, nickel, cobalt, chromium, platinum, palladium, magnesium, zinc.

15. The luminescing method of claim 13, wherein metal of the metal layer is at least one of gold, silver, aluminum.

16. The luminescing method of claim 13, wherein the metal layer has a thickness of 0.5 nm to 200 nm.

17. The luminescing method of claim 13, wherein the metal layer is formed by sputtering or evaporation depositing metal on the surface of the luminescent glass substrate.

18. The luminescing method of claim 13, wherein the annealing treatment in vacuum is performed at 50 centigrade degrees to 650 centigrade degrees for five minutes to five hours.

* * * * *